(12) United States Patent
Asao et al.

(10) Patent No.: US 7,610,973 B2
(45) Date of Patent: Nov. 3, 2009

(54) AUTOMOTIVE ELECTRIC MOTOR-GENERATOR APPARATUS

(75) Inventors: Yoshihito Asao, Tokyo (JP); Yutaka Kitamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 281 days.

(21) Appl. No.: 10/830,320

(22) Filed: Apr. 23, 2004

(65) Prior Publication Data

US 2004/0211613 A1   Oct. 28, 2004

(30) Foreign Application Priority Data

Apr. 23, 2003   (JP) .............................. 2003-118739

(51) Int. Cl.
    B60K 6/26    (2007.10)
    H02K 9/06    (2006.01)
(52) U.S. Cl. .................. 180/65.21; 310/68 R; 903/906
(58) Field of Classification Search ............... 180/65.1, 180/65.2, 65.3, 65.4; 701/22; 310/68 R; 903/906, 952

See application file for complete search history.

(56) References Cited

U.S. PATENT DOCUMENTS

| | | | |
|---|---|---|---|
| 4,797,602 A * | 1/1989 | West ............................ | 322/10 |
| 5,331,239 A | 7/1994 | Kwun et al. | |
| 5,517,401 A * | 5/1996 | Kinoshita et al. ............. | 363/98 |
| 5,543,703 A * | 8/1996 | Kusase et al. ................. | 322/16 |
| 6,048,288 A | 4/2000 | Kuramochi | |
| 6,160,335 A * | 12/2000 | Ishida et al. ............... | 310/68 D |
| 6,166,498 A * | 12/2000 | Yamaguchi et al. ........... | 318/34 |
| 6,191,506 B1 * | 2/2001 | Wright ........................ | 29/598 |
| 6,323,613 B1 * | 11/2001 | Hara et al. ................... | 318/471 |
| 6,525,438 B1 * | 2/2003 | Asao ........................ | 310/68 D |
| 6,598,691 B2 * | 7/2003 | Mita et al. ................. | 180/65.1 |
| 2001/0049571 A1 | 12/2001 | Shimizu et al. | |
| 2002/0007975 A1 | 1/2002 | Naito et al. | |
| 2002/0175008 A1 | 11/2002 | Angerer et al. | |
| 2003/0173839 A1 * | 9/2003 | Torii et al. .................... | 310/52 |

FOREIGN PATENT DOCUMENTS

| | | |
|---|---|---|
| DE | 198 23 769 A1 | 12/1999 |
| EP | 1 000 790 A2 | 5/2000 |
| EP | 1 093 958 A2 | 4/2001 |
| JP | 06-030547 A | 2/1994 |
| JP | 07-099750 A | 4/1995 |
| JP | 11-027806 | 1/1999 |
| JP | 11-098612 | 4/1999 |
| JP | 11-147424 | 6/1999 |
| JP | 11-147424 A | 6/1999 |
| JP | 11-155257 A | 6/1999 |
| JP | 11-180162 A | 7/1999 |
| JP | 2001-251815 A | 9/2001 |
| JP | 2001-322439 A | 11/2001 |
| JP | 2001095103 AA | 4/2006 |

* cited by examiner

Primary Examiner—Frank B Vanaman
(74) Attorney, Agent, or Firm—Sughrue Mion, PLLC

(57) ABSTRACT

An inverter unit is provided with: a case for housing a circuit board on which switching elements, diodes, and a capacitor are mounted; and a heat sink constructed integrally with the case. The inverter unit is mounted to an upper portion of the rotary electric machine by fixing the case to a mounting plate mounted to a boss. In addition, the inverter unit is electrically connected to three phase output terminals projecting out of a rear bracket by means of alternating-current wiring, and is electrically connected to a battery by means of direct-current wiring.

5 Claims, 6 Drawing Sheets

AUTOMOTIVE ELECTRIC MOTOR-GENERATOR APPARATUS

BACKGROUND OF THE INVENTION

1. Field of the Invention

The present invention relates to a configurative relationship between a rotary electric machine and an inverter unit for controlling the rotary electric machine in an automotive electric motor-generator apparatus mounted to an electric vehicle or a hybrid vehicle, etc., and relates particularly to a construction for mounting the inverter unit enabling torque characteristics of the rotary electric machine to be improved.

2. Description of the Related Art

In recent years, reductions in $CO_2$ emissions are being sought, backed by a need to prevent global warming. Reduction of $CO_2$ in vehicles means improving fuel consumption performance, and development and testing of electric vehicles (EVs) or hybrid vehicles (HEVs) are being advanced as one solution.

In particular, functions demanded of rotary electric machines mounted to hybrid vehicles include idling when a vehicle is stopped, energy regeneration during deceleration, torque assistance during acceleration, etc., and improvements in fuel consumption performance are becoming possible by implementing these functions.

An electric motor-generator is mounted transversely outside an engine. A belt is placed around the electric motor-generator and a crank shaft pulley such that bidirectional transmission of driving forces can be performed between the electric motor-generator and the engine.

Thus, during electric motor operation, direct-current power from a battery is converted to alternating-current power by an inverter. This alternating-current power is supplied to the electric motor-generator, driving the electric motor-generator to rotate. Torque therefrom is transmitted to the engine by means of the belt, starting the engine. During electric power generation, on the other hand, a portion of the driving force from the engine is transmitted to the electric motor-generator by means of the belt, generating alternating-current power, and this alternating-current power is converted to direct-current power by the inverter and stored in the battery. (See Patent Literature 1, for example.)

Patent Literature 1: Japanese Patent Laid-Open No. 2001-95103 (Gazette: FIG. 2)

In conventional automotive electric motor-generator apparatuses, because the inverter is disposed far away from the electric motor-generator, the wiring length of the alternating-current wiring electrically connecting the inverter and the electric motor-generator is long. As a result, because the wiring resistance in the alternating-current wiring is large, increasing voltage drop in the alternating-current wiring, one problem is that situations may arise such as not being able to supply enough electric power to the electric motor-generator to make it output a desired torque, or it being impossible to increase rotation in the electric motor-generator to a desired rotational speed, etc.

It is also conceivable that the wiring resistance might be reduced by increasing the thickness of the alternating-current wiring in order to suppress the voltage drop in the alternating-current wiring. However, in that case, one problem is that wiring weight and wiring costs increase significantly.

SUMMARY OF THE INVENTION

The present invention aims to solve the above problems and an object of the present invention is to provide an automotive electric motor-generator apparatus significantly improving torque characteristics of a rotary electric machine and enabling significant weight and cost increases to be avoided by mounting an inverter unit in a vicinity of the rotary electric machine to shorten wiring length in alternating-current wiring connecting the inverter unit and the rotary electric machine to suppress voltage drop in the alternating-current wiring.

With the above object in view, an automotive electric motor-generator apparatus of the present invention includes a battery; an engine; and a rotary electric machine linked to the engine, the rotary electric machine being driven by electric power from the battery to start the engine during starting of the engine, and being driven by the engine to generate alternating-current power after starting the engine. Also, provided is an inverter unit for converting direct-current power from the battery into alternating-current power and supplying the alternating-current power to the rotary electric machine during the starting of the engine, and converting alternating-current power generated in the rotary electric machine into direct-current power and charging the battery after starting the engine. Further, provided are alternating-current wiring for electrically connecting the rotary electric machine and the inverter unit; and direct-current wiring for electrically connecting the battery and the inverter unit. The automotive electric motor-generator apparatus is characterized in that the inverter unit is installed in close proximity to the rotary electric machine.

Therefore, torque characteristics of the rotary electric machine are able to be improved and significant weight and cost increases are able to be avoided by shortening wiring length in alternating-current wiring connecting the inverter unit and the rotary electric machine to suppress voltage drop in the alternating-current wiring.

DETAILED DESCRIPTION OF THE PREFERRED EMBODIMENTS

Preferred embodiments of the present invention will now be explained with reference to the drawings.

Embodiment 1

Figure 1:
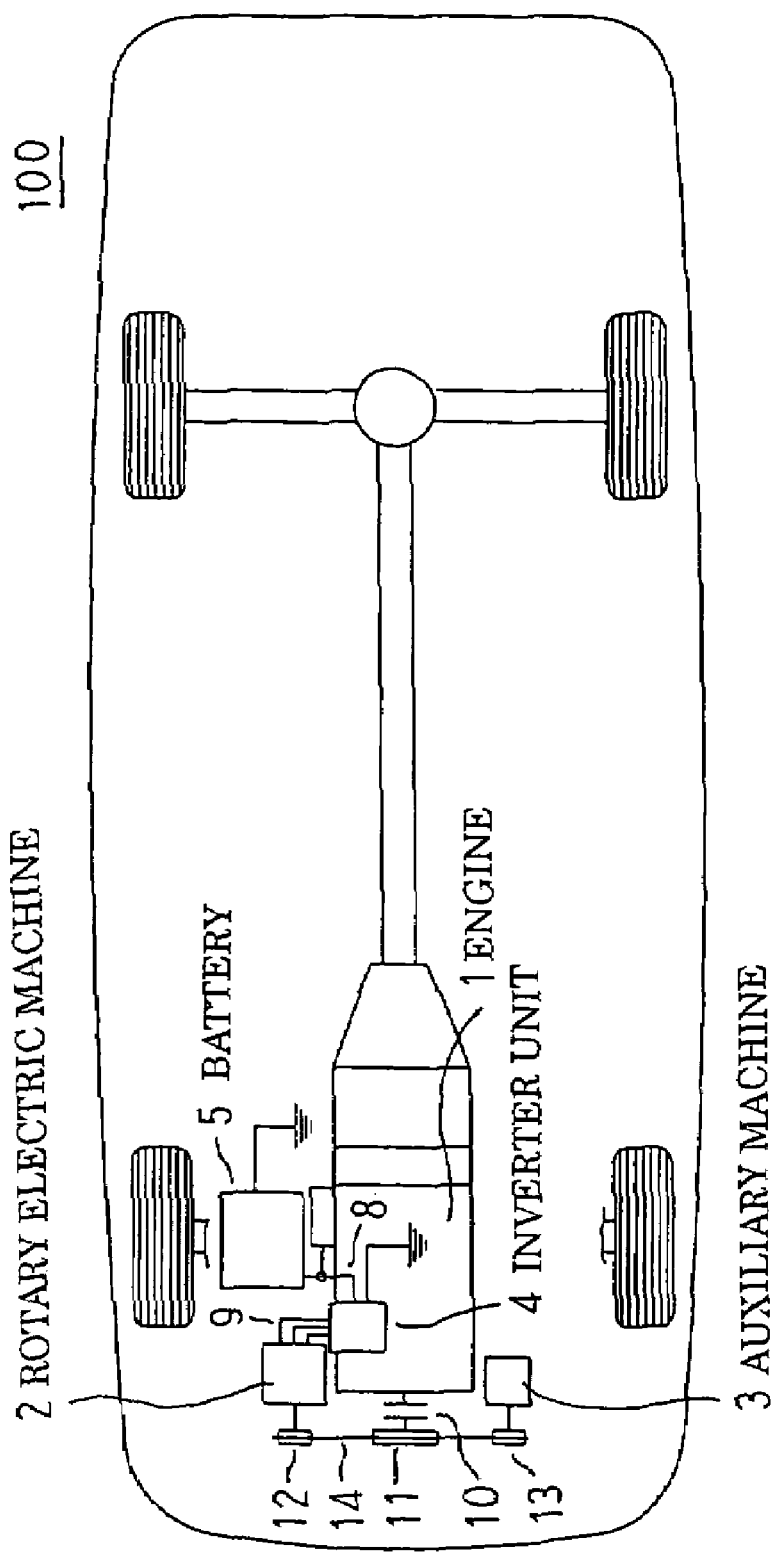
FIG. 1 is a conceptual diagram explaining a configurative relationship of an inverter unit in a hybrid vehicle mounted with an automotive electric motor-generator apparatus according to Embodiment 1 of the present invention.
Figure 2:
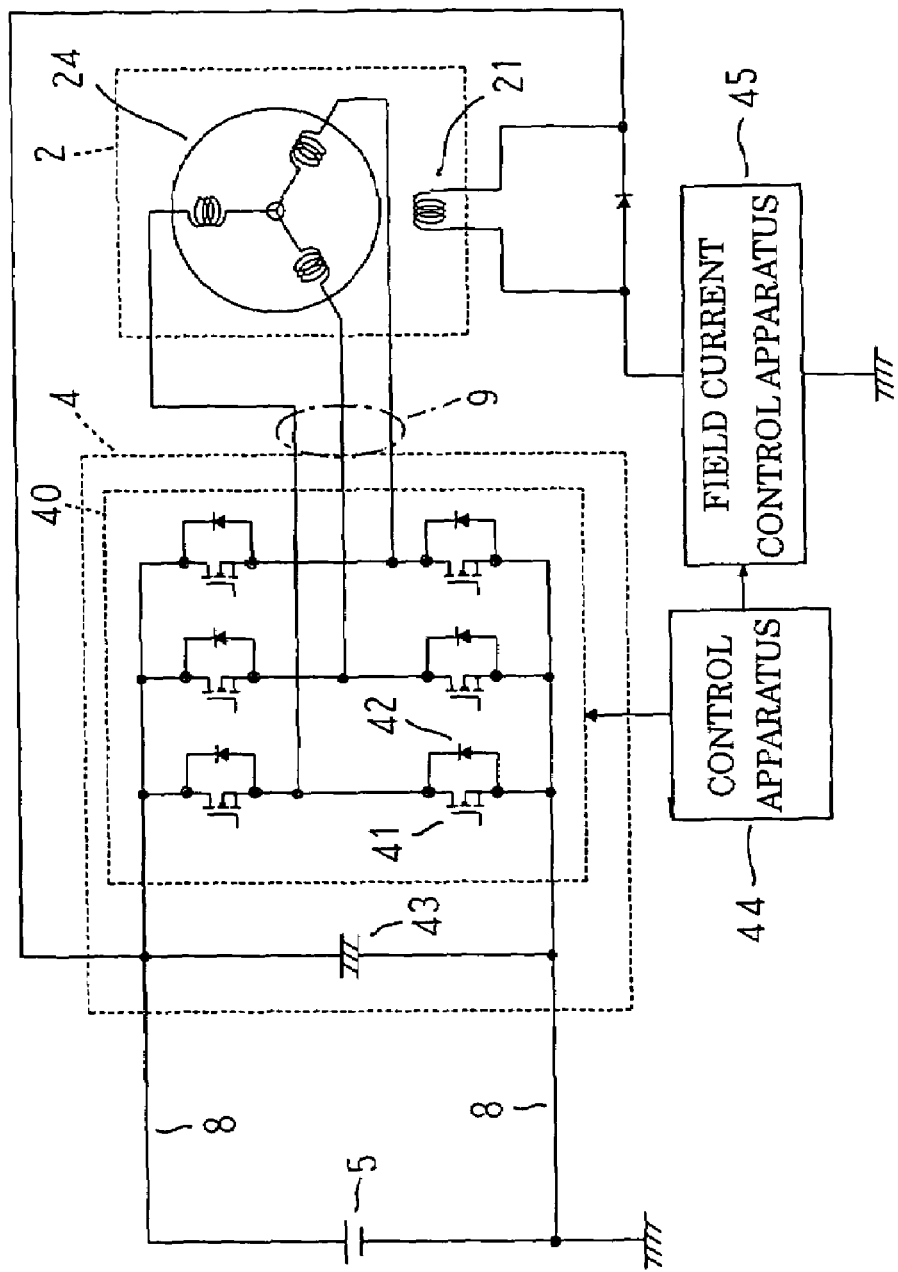
FIG. 2 is a conceptual diagram of a circuit in the hybrid vehicle mounted with the automotive electric motor-generator apparatus according to Embodiment 1 of the present invention.

FIG. 1 is a conceptual diagram explaining a configurative relationship of an inverter unit in a hybrid vehicle mounted with an automotive electric motor-generator apparatus according to Embodiment 1 of the present invention, and FIG. 2 is a conceptual diagram of a circuit in the hybrid vehicle mounted with the automotive electric motor-generator apparatus according to Embodiment 1 of the present invention.

In FIG. 1, a rotary electric machine 2 is a winding field synchronous motor, and is disposed in close proximity to an engine 1. An inverter unit 4 is mounted to the engine 1 in close proximity to the rotary electric machine 2. The inverter unit 4 and a battery 5 are electrically connected by direct-current wiring 8, and the rotary electric machine 2 and the inverter unit 4 are electrically connected by alternating-current wiring 9. A crank pulley 11 is linked to a crankshaft of the engine 1 by means of a clutch apparatus 10. Belts 14 are placed around the crank pulley 11 and a rotary electric machine pulley 12 fixed to the rotating shaft of the rotary electric machine 2, and around the crank pulley 11 and an auxiliary machine pulley 13 fixed to a rotating shaft of an auxiliary machine 3, respectively.

In a hybrid vehicle 100 mounted with an automotive electric motor-generator apparatus constructed in this manner, direct-current power is supplied to the inverter unit 4 from the battery 5 by means of the direct-current wiring 8, and is converted to three-phase alternating-current power by the inverter unit 4. The three-phase alternating-current power converted by the inverter unit 4 is then supplied to the rotary electric machine 2 by means of the three-phase alternating-current wiring 9, driving the rotary electric machine 2.

Rotational power from the driven rotary electric machine 2 is transmitted from the rotary electric machine pulley 12 to the crank pulley 11 and the auxiliary machine pulley 13 by means of the belts 14.

Here, when the clutch apparatus 10 is on (engaged), the rotational power from the rotary electric machine 2 is transmitted to the engine 1, starting the engine 1. Then, once the engine 1 is started, rotational power from the engine 1 is transmitted to the rotary electric machine 2 and the auxiliary machine 3 by means of the crank pulley 11 and the belts 14. Thus, the rotary electric machine 2 is driven to rotate, inducing a three-phase alternating-current voltage. This three-phase alternating-current voltage from the rotary electric machine 2 is output to the inverter unit 4 by means of the alternating-current wiring 9, is converted to direct-current power, and charges the battery 5 by means of the direct-current wiring 8.

When the clutch apparatus 10 is off (disengaged), transfer of power between the crank pulley 11 and the engine 1 is mutually interrupted.

In FIG. 2, a rotary electric machine 2 is provided with: an armature winding 24 of an armature (not shown); and a field winding 21 of a rotor (not shown). An inverter unit 4 is provided with: an inverter module 40 composed of a plurality of switching elements 41 and diodes 42 connected in parallel with each of the switching elements 41; and a capacitor 43 connected in parallel to this inverter module 40. The inverter module 40 is constructed by forming element-diode sets each constituted by a switching element 41 and a diode 42 connected in parallel, connecting pairs of element-diode sets in series, and disposing three such pairs in parallel.

Each of the Y-connected (star-connected) end portions of the armature winding 24 is electrically connected to a respective intermediate point between the switching elements 41 connected in series by means of the alternating-current wiring 9. A positive terminal and a negative terminal of the battery 5 are electrically connected to a positive side and a negative side, respectively, of the inverter module 40 by means of the direct-current wiring 8.

The switching operation of the switching elements 41 in the inverter module 40 is controlled by a control apparatus 44. The control apparatus 44 also adjusts a field current passed through the field winding 21 by controlling a field current control apparatus 45.

Next, idling operation of a hybrid vehicle constructed in this manner will be explained.

First, when conditions for commencing idling are satisfied, the engine 1 is stopped. Then, when conditions for restarting the engine 1 are all present, direct-current power is supplied to the inverter unit 4 from the battery 5 by means of the direct-current wiring 8. The control apparatus 44 controls switching on and off of each of the switching elements 41 of the inverter module 40 to convert the direct-current power to three-phase alternating-current power. This three-phase alternating-current power is supplied to the armature winding 24 of the rotary electric machine 2 by means of the alternating-current wiring 9. Thus, a rotating magnetic field is applied around the field winding 21 of the rotor to which a field current is being supplied by the field current control apparatus 45, driving the rotor to rotate.

Then, this rotational power from the rotor is transmitted to the engine 1 by means of the rotary electric machine pulley 12, a belt 14, the crank pulley 11, and the switched-on (engaged) dutch apparatus 10, starting the engine 1.

Then, once the engine 1 is started, rotational power from the engine 1 is transmitted to the rotary electric machine 2 by means of the crank pulley 11, a belt 14, and the rotary electric machine pulley 12. Thus, the rotor is driven to rotate, inducing a three-phase alternating-current voltage in the armature winding 24. Then, the control apparatus 44 controls switching on and off of each of the switching elements 41 to convert the three-phase alternating-current voltage induced in the armature winding 24 into direct-current power and charge the battery 5.

In Embodiment 1, because the inverter unit 4 is mounted to the engine 1 in close proximity to the rotary electric machine 2, the wiring length of the alternating-current wiring 9 for electrically connecting the rotary electric machine 2 and the inverter unit 4 is shortened. Thus, because wiring resistance in the alternating-current wiring 9 is reduced, voltage drop in the alternating-current wiring 9 can be reduced. Thus, because sufficient electric current is supplied to the rotary electric machine 2 and a desired torque to be output and rotation can be increased to a desired rotational speed, torque characteristics of the rotary electric machine 2 can be improved.

Because the wiring length of the alternating-current wiring 9 is shorter, wiring resistance can be lowered without increasing wiring diameter. Thus, weight reductions are enabled in the wiring, and wiring costs can be lowered.

Moreover, in Embodiment 1 above, the inverter unit 4 is mounted to the engine 1 in close proximity to the rotary electric machine 2, but the inverter unit 4 may also be mounted to a body of a vehicle in close proximity to the rotary electric machine 2.

In Embodiment 1 above, the battery 5 may also be disposed in close proximity to the inverter unit 4. In that case, the wiring length of the direct-current wiring 8 is also shortened and voltage drop in the direct-current wiring 8 is also reduced, enabling torque characteristics of the rotary electric machine 2 to be further improved.

Embodiment 2

Figure 3:
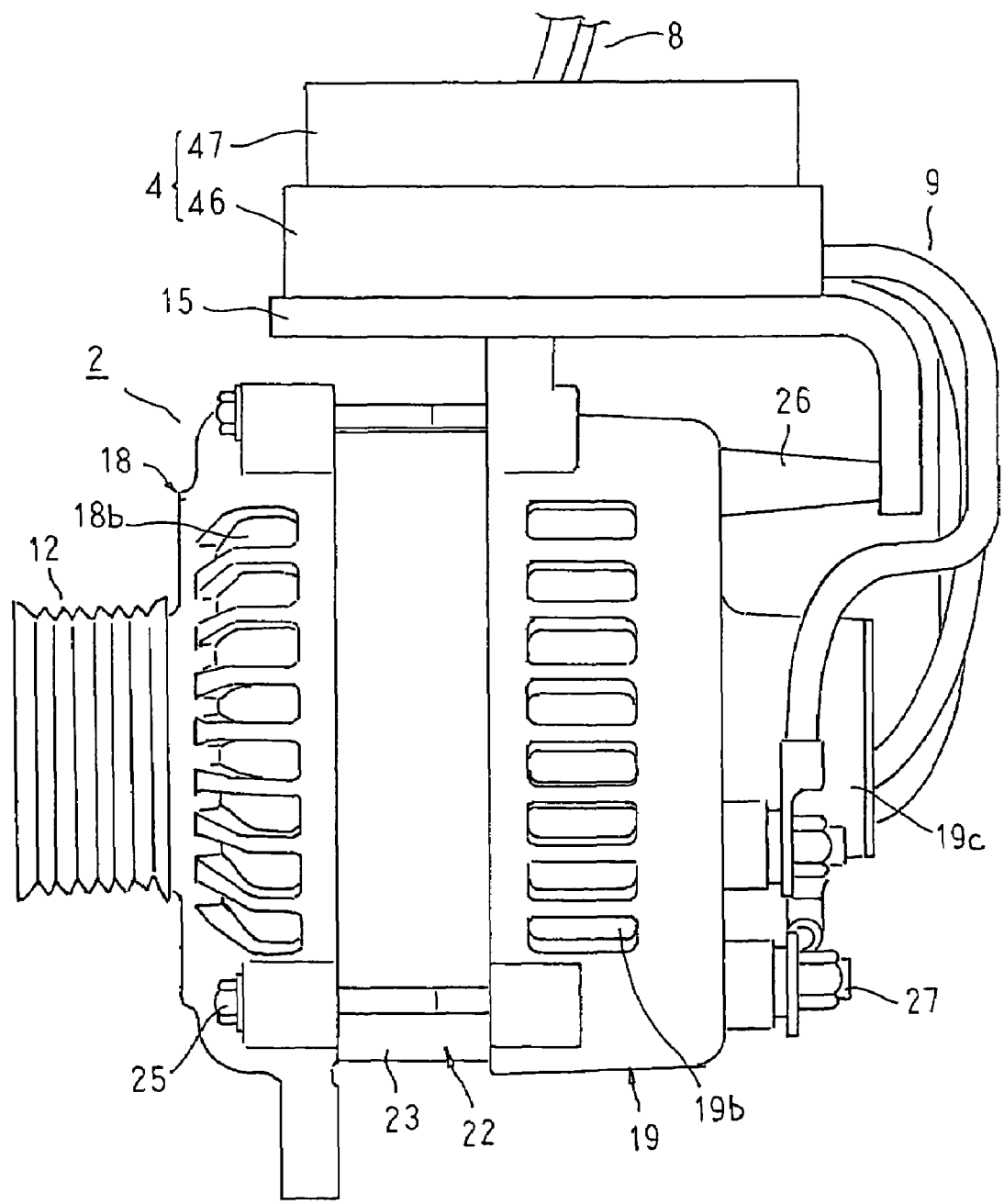
FIG. 3 is an external conceptual diagram showing a construction for mounting an inverter unit in an automotive electric motor-generator apparatus according to Embodiment 2 of the present invention.

FIG. 3 is an external conceptual diagram showing a construction for mounting an inverter unit in an automotive electric motor-generator apparatus according to Embodiment 2 of the present invention.

In FIG. 3, a rotary electric machine 2 is provided with: a rotor (not shown) having a supported shaft (not shown) and being rotatably disposed inside a case made of a front bracket 18 and a rear bracket 19; and an armature 22 disposed such that radial edge portions at first and second axial ends of an armature core 23 are held between the front bracket 18 and the rear bracket 19 so as to surround the rotor. The front bracket 18 and the rear bracket 19 are fastened together by a through bolt 25. A rotary electric machine pulley 12 is fixed to an end of the shaft of the rotor projecting out through the front bracket 18. A boss 26 is disposed so as to protrude from an outer circumferential surface of the rear bracket 19. In addition, three phase output terminals 27 are inserted through the rear bracket 19 and are supported in an electrically-insulated state, being electrically connected to each of three phase wires (output wires) extending from Y-connection end portions of an armature winding 24.

An inverter unit 4 is constituted by: a case 46 made of electrically-insulating resin; and a heat sink 47 formed integrally with the case 46. This heat sink 47 is shaped into a flat shape using a metal having good thermal conductivity such as copper, aluminum, etc. A plurality of fins (not shown) are disposed upright on a first surface of the heat sink 47. A circuit board (not shown) on which switching elements 41, diodes 42, and a capacitor 43 are mounted in the circuit configuration shown in FIG. 2 is mounted in an electrically-insulated state on a second surface of the heat sink 47, and is housed inside the case 46. This inverter unit 4 is mounted so as to be positioned on an upper portion of the rotary electric machine 2 by fixing the case 46 to a mounting plate 15 functioning as a mounting member securely fastened to the boss 26 that is disposed so as to protrude from the outer circumferential surface of the rear bracket 19. The inverter unit 4 is electrically connected to the three phase output terminals 27 projecting out through the rear bracket 19 by means of alternating-current wiring 9. In addition, the inverter unit 4 is electrically connected to a battery (not shown) by means of direct-current wiring 8.

Moreover, the rest of this embodiment is constructed in a similar manner to Embodiment 1 above.

In Embodiment 2, because the inverter unit 4 is mounted in close proximity to an upper portion of the rotary electric machine 2, the wiring length of the alternating-current wiring 9 is consequently shortened, enabling similar effects to those in Embodiment 1 to be achieved.

Because the inverter unit 4 is disposed on the upper portion of the rotary electric machine 2, even if there is no horizontal space to install the inverter unit 4 alongside the rotary electric machine 2, installation is possible if there is vacant space radially above the rotary electric machine 2, improving layout characteristics.

Because a mounting plate 15 is used to mount the inverter unit 4 to the rotary electric machine 2, the disposed position of the inverter unit 4 relative to the rotary electric machine 2 can be altered simply by changing the shape of the mounting plate 15. Specifically, the inverter unit 4 can be disposed on a side portion or at a rear end of the rotary electric machine 2 simply by considering vacant space in a vicinity (radial side surfaces) of the rotary electric machine 2 and modifying the shape of the mounting plate 15.

Embodiment 3

Figure 4:
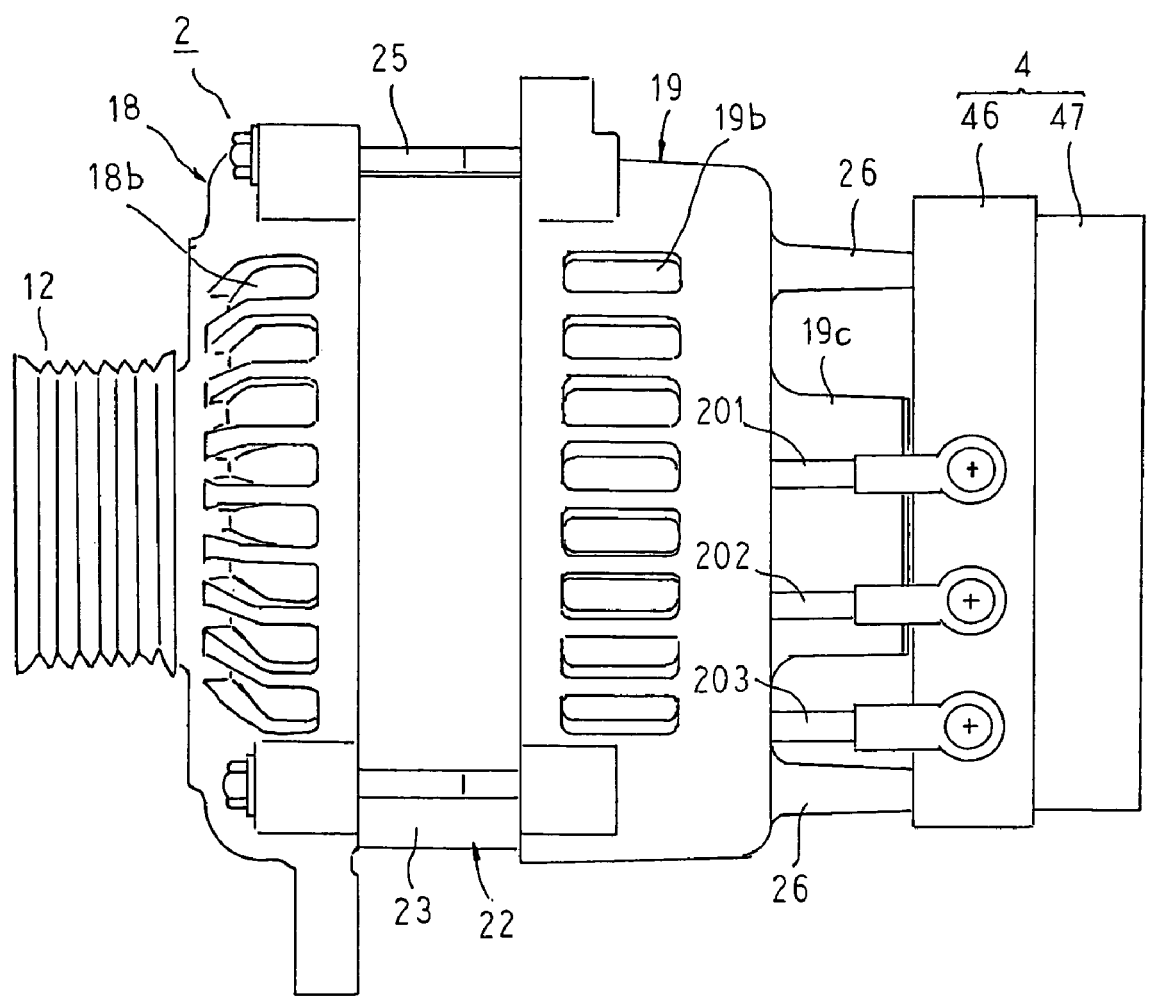
FIG. 4 is an external conceptual diagram showing a construction for mounting an inverter unit in an automotive electric motor-generator apparatus according to Embodiment 3 of the present invention.

FIG. 4 is an external conceptual diagram showing a construction for mounting an inverter unit in an automotive electric motor-generator apparatus according to Embodiment 3 of the present invention.

In FIG. 4, an inverter unit 4 is mounted directly to a rear end of a rotary electric machine 2 by securely fastening a case 46 to a boss 26 disposed so as to protrude from a rear bracket 19. Three phase wires 201, 202, and 203 functioning as output wires extending from Y-connection end portions of an armature winding 24 project outward through the rear bracket 19, and are electrically connected to the inverter unit 4 directly. In this case, the three phase wires 201, 202, and 203 correspond to alternating-current wiring.

Moreover, the rest of this embodiment is constructed in a similar manner to Embodiment 2 above.

In Embodiment 3, because the inverter unit 4 is mounted directly to the rear end of the rotary electric machine 2, the distance between the inverter unit 4 and the rotary electric machine 2 is very short. Thus, the inverter unit 4 and the three phase wires 201, 202, and 203 extending from the Y-connection end portions of the armature winding 24 can be connected directly, eliminating increases in resistance between the inverter unit and the armature winding 24 as a result of using separately-provided alternating-current wiring 9. Thus, voltage drop between the inverter unit 4 and the armature winding 24 is minimized, enabling torque characteristics of the rotary electric machine 2 to be improved significantly.

Because the inverter unit 4 is disposed on an axial end surface of the rotary electric machine 2, even if there is no horizontal space to install the inverter unit 2 alongside the rotary electric machine 2, installation is possible if there is vacant space near the axial end surface of the rotary electric machine 2, improving layout characteristics.

Because the three phase output terminals 27 are omitted, increase in resistance due to the three phase output terminals 27 themselves, and also increase in resistance due to connection portions between the three phase wires 201, 202, and 203 and the three phase output terminals 27 and between the alternating-current wiring 9 and the three phase output terminals 27 are eliminated, further reducing voltage drop between the inverter unit 4 and the armature winding 24 and enabling reductions in cost and weight.

Furthermore, the inverter unit 4 is mounted directly to the rotary electric machine 2. Thus, mounting space is reduced, improving layout characteristics. In addition, because the inverter unit 4 and the rotary electric machine 2 are displaced together relative to external vibrations, excessive stresses are not applied to the three phase wires 201, 202, and 203, suppressing the occurrence of wire breakage.

Moreover, in Embodiment 3 above, the three phase output terminals 27 are omitted, but the three phase output terminals 27 may also be disposed, and the three phase output terminals 27 and the inverter unit 4 connected electrically by alternating-current wiring 9. In that case, because the distance between the inverter unit 4 and the rotary electric machine 2 is still very short, the wiring length of the alternating-current wiring 9 can be shortened compared to Embodiment 2 above, achieving torque characteristic improvement effects.

In Embodiment 3 above, the inverter unit 4 is mounted directly to a rear-end end portion of the rotary electric machine 2, but the inverter unit 4 may also be mounted directly to an upper portion or a side portion of the rotary electric machine 2.

Embodiment 4

Figure 5:
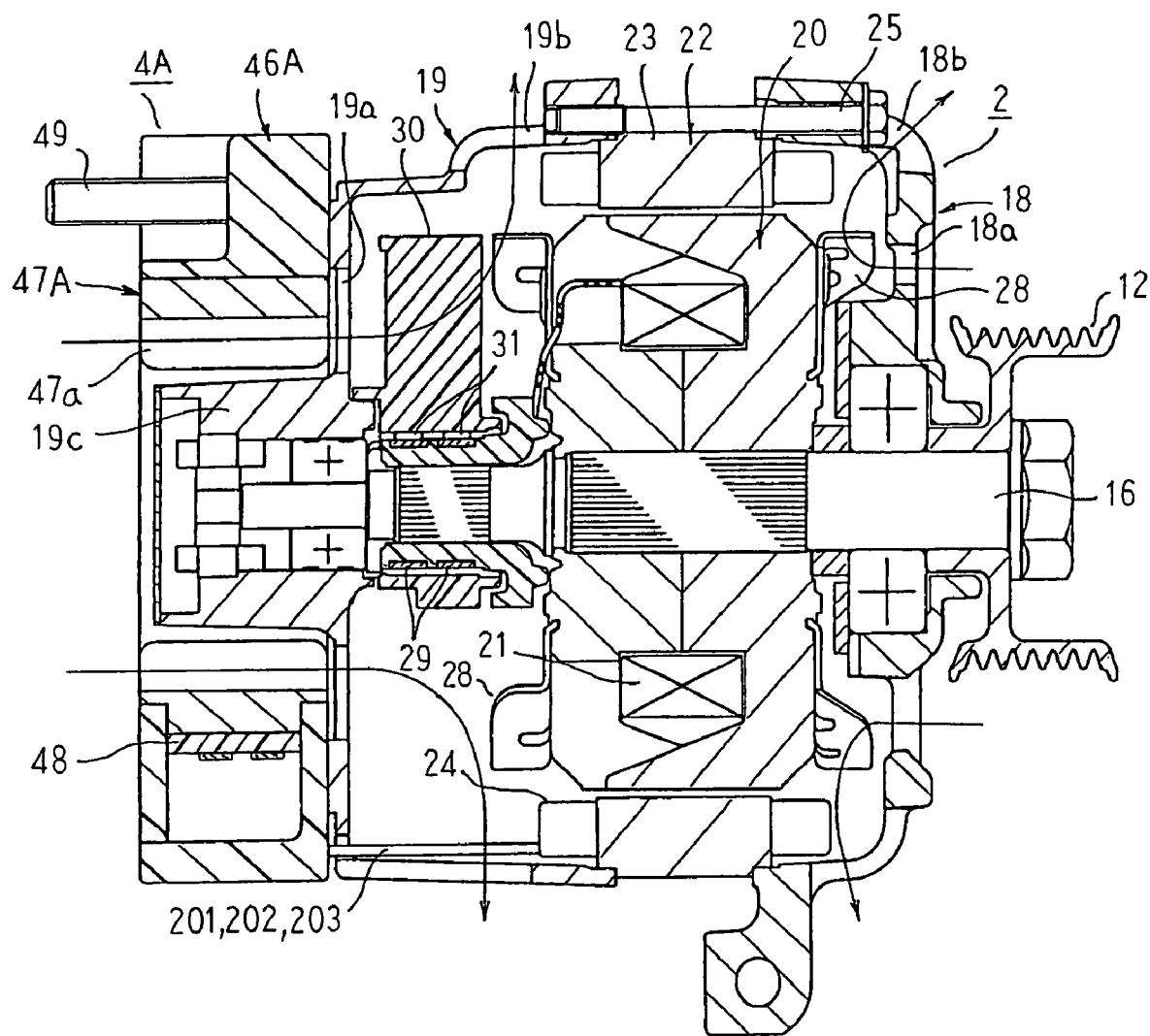
FIG. 5 is a longitudinal section for explaining a construction for mounting an inverter unit in an automotive electric motor-generator apparatus according to Embodiment 4 of the present invention.

FIG. 5 is a longitudinal section for explaining a construction for mounting an inverter unit in an automotive electric motor-generator apparatus according to Embodiment 4 of the present invention.

In FIG. 5, a rotary electric machine 2 is provided with: a rotor 20 provided with a field winding 21, having a supported shaft 16 and being rotatably disposed inside a case made of a front bracket 18 and a rear bracket 19; and an armature 22 disposed such that radial edge portions at first and second axial ends of an armature core 23 are held between the front bracket 18 and the rear bracket 19 so as to surround the rotor 20. The front bracket 18 and the rear bracket 19 are fastened together by a through bolt 25. A rotary electric machine pulley 12 is fixed to an end of the shaft 16 of the rotor 20 projecting outward through the front bracket 18. Fans 28 are each fixed to first and second axial end surfaces of the rotor 20. A pair of slip rings 29 are mounted to a rear end of the shaft 16. In addition, a brush holder 30 is disposed on an inner wall surface of the rear bracket 19 so as to be positioned on an outer periphery of a rear end of the shaft 16, and a pair of brushes 31 are disposed inside the brush holder 30 so as to slide respectively in contact with the pair of slip rings 29.

Front-end and rear-end air intake apertures 18a and 19a are disposed through end surfaces of the front bracket 18 and the rear bracket 19, respectively, and front-end and rear-end air discharge apertures 18b and 19b are disposed through side surfaces of the front bracket 18 and the rear bracket 19, respectively.

An inverter unit 4A is constituted by: a case 46A made of electrically-insulating resin; and a heat sink 47A formed integrally with the case 46A. This heat sink 47A is shaped into a C shape using a metal having good thermal conductivity such as copper, aluminum, etc., fins 47a extending radially being disposed upright at a uniform angular pitch in a circumferential direction on an inner wall surface of the heat sink 47A. A circuit board 48 is disposed on the heat sink 47A in an electrically-insulated state, and is housed inside the case 46A. Switching elements 41, diodes 42, and a capacitor 43 are mounted on the circuit board 48 to construct the circuit shown in FIG. 2.

The inverter unit 4A constructed in this manner is mounted directly to an end surface of the rear bracket 19 such that the heat sink 47A surrounds a bearing box 19c of the rear bracket 19. Three phase wires 201, 202, and 203 extending from Y-connection end portions of an armature winding 24 project outward through the rear bracket 19, and are electrically connected to the inverter unit 4A. In addition, a battery (not shown) is electrically connected to an electric power terminal 49 of the inverter unit 4A by means of direct-current wiring (not shown).

In Embodiment 4, the fans 28 are driven to rotate when the rotor 20 is driven to rotate. Thus, as indicated by the arrows in FIG. 5, cooling airflows are formed in which cooling air is introduced into the front and rear brackets 18 and 19 through the front-end and rear-end air intake apertures 18a and 19a, are deflected centrifugally by the fans 28, and are discharged through the front-end and rear-end air discharge apertures 18b and 19b. The armature winding 24 is cooled by these cooling airflows. At this time, a cooling airflow flows over the fins 47a of the heat sink 47A, and heat generated in the switching elements 41 and the diodes 42 is radiated by means of the fins 47a to the cooling airflow.

Consequently, because the inverter unit 4A is mounted directly to the rear end of the rotary electric machine 2, and the three phase wires 201, 202, and 203 of the armature winding 24 are electrically connected to the inverter unit 4A directly, similar effects to those in Embodiment 3 above can also be achieved in Embodiment 4.

In Embodiment 4, because the inverter unit 4A is cooled by a cooling airflow forcibly formed by the fans 28, the inverter unit 4A is cooled efficiently. Thus, the heat sink 47A can be made compact, enabling reductions in the size of the inverter unit 4A, and improving the mountability of the inverter unit 4A onto the rear bracket 19. In addition, because the inverter unit 4A and the rotary electric machine 2 are cooled by the cooling airflows formed by the fans 28, a cooling medium for the inverter unit 4A is also used as a cooling medium (the cooling airflows) for the rotary electric machine 2, simplifying the cooling construction.

Embodiment 5

Figure 6:
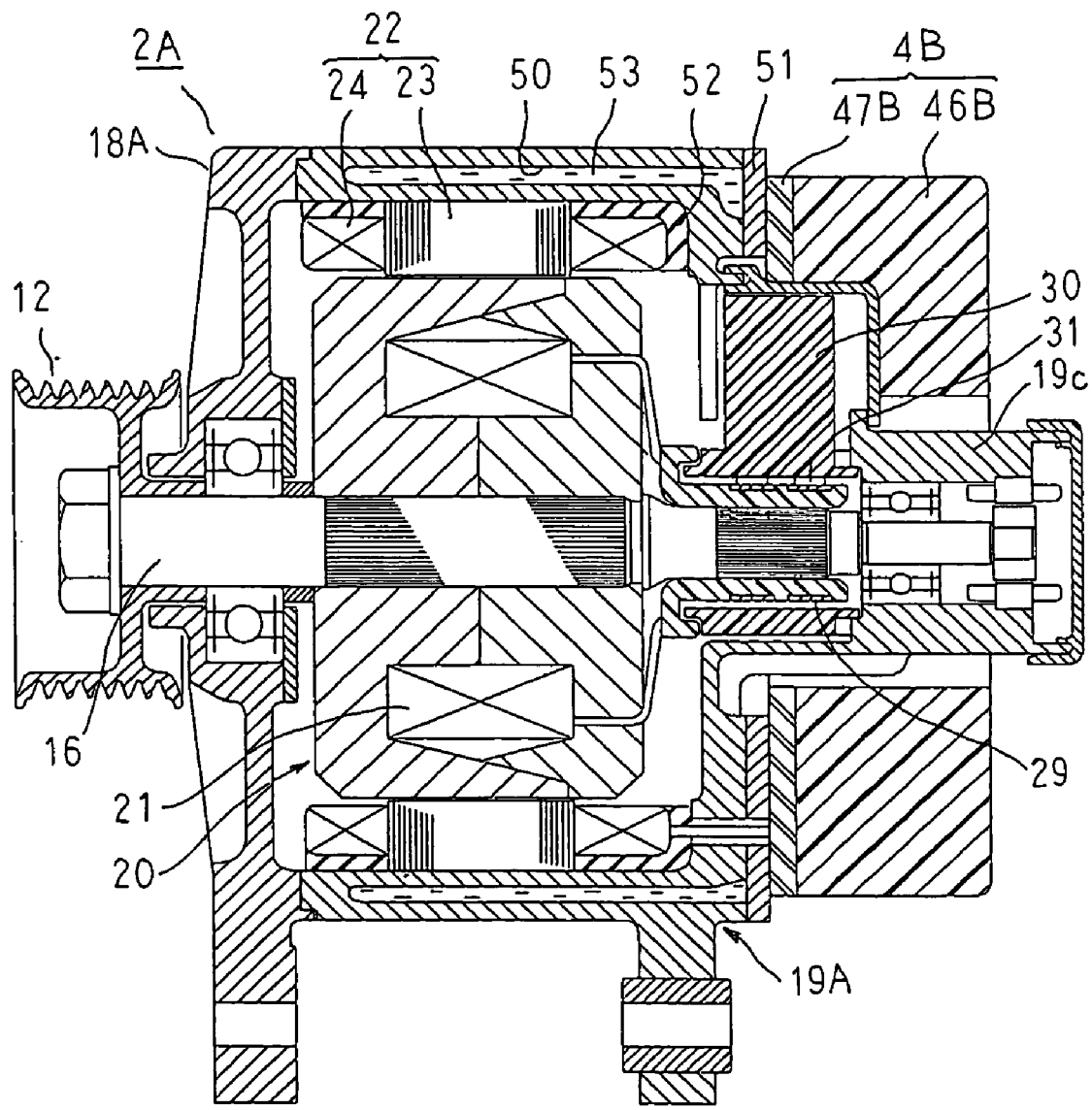
FIG. 6 is a longitudinal section for explaining a construction for mounting an inverter unit in an automotive electric motor-generator apparatus according to Embodiment 5 of the present invention.

FIG. 6 is a longitudinal section for explaining a construction for mounting an inverter unit in an automotive electric motor-generator apparatus according to Embodiment 5 of the present invention.

In FIG. 6, a rotary electric machine 2A is provided with: a rotor 20 provided with a field winding 21, having a supported shaft 16 and being rotatably disposed inside a case made of a front bracket 18A and a rear bracket 19A; and an armature 22 disposed such that radial edge portions at first and second axial ends of an armature core 23 are fixed to the front bracket 18A and the rear bracket 19A so as to surround the rotor 20. A pair of slip rings 29 are mounted to a rear end of the shaft 16. In addition, a brush holder 30 is disposed on an inner wall surface of the rear bracket 19A so as to be positioned on an outer periphery of a rear end of the shaft 16, and a pair of brushes 31 are disposed inside the brush holder 30 so as to slide respectively in contact with the pair of slip rings 29.

A liquid cooling passage 50 is recessed into the rear bracket 19A, and an aluminum rear plate 51 is mounted to the rear bracket 19A so as to seal the liquid cooling passage 50 in a liquid-tight state. Furthermore, although not shown, an inflow tube and an outflow tube are linked to the liquid cooling passage 50 to distribute a cooling medium 53. In addition, a thermally-conducting filler 52 made of thermally-conductive resin, such as silicone resin, for example, is injected between the rear bracket 19A and coil ends of the armature winding 24.

An inverter unit 4B is constituted by: a case 46B made of electrically-insulating resin; and a heat sink 47B formed integrally with the case 46B. This heat sink 47B is shaped into a flat C shape using a metal having good thermal conductivity such as copper, aluminum, etc. Although not shown, a circuit board on which switching elements, diodes, and a capacitor are mounted is disposed on the heat sink 47B in an electrically-insulated state, and is housed inside the case 46B.

The inverter unit 4B constructed in this manner is mounted directly to a rear plate 51 such that the heat sink 47B surrounds a bearing box 19c of the rear bracket 19A. Three phase wires 201, 202, and 203 extending from Y-connection end portions of an armature winding 24 project outward through the rear bracket 19A, and are electrically connected to the inverter unit 4B.

In Embodiment 5, a cooling medium 53 of an engine is fed into the liquid cooling passage 50 through the inflow tube, flows through the liquid cooling passage 50, and is then discharged through a discharge tube. Heat generated in the armature winding 24 is transferred to the rear bracket 19A by means of the thermally-conducting filler 52, and is absorbed into the cooling medium 53 flowing through the liquid cooling passage 50. Heat generated in the switching elements and the diodes inside the case 46B is transferred to the rear plate 51 by means of the heat sink 47B, and is also absorbed into the cooling medium 53 flowing through the liquid cooling passage 50.

Because the inverter unit 4B is mounted directly to the rear end of the rotary electric machine 2A, and the three phase wires 201, 202, and 203 of the armature winding 24 are electrically connected to the inverter unit 4B, similar effects to those in Embodiment 3 above can also be achieved in Embodiment 5.

In Embodiment 5, because the inverter unit 4B is cooled by the cooling medium 53 flowing through the liquid cooling passage 50, the inverter unit 4B is cooled efficiently. Thus, the heat sink 47B can be made compact, enabling reductions in the size of the inverter unit 4B, and improving the mountability of the inverter unit 4B onto the rear bracket 19A. In addition, the cooling medium 53 is shared between the inverter unit 4B and the rotary electric machine 2A, simplifying the cooling construction.

Moreover, in each of the above embodiments, the armature winding 24 is constructed by Y-connecting three phases of coil, but the armature winding 24 may also be constructed by delta-connecting three phases of coil.

In each of the above embodiments, the armature winding 24 is constructed into a three-phase alternating-current winding, but the armature winding 24 is not limited to three phases and may also have four phases, five phases, or six phases, for example.

In each of the above embodiments, the present invention has been explained as applying to hybrid vehicles, but similar effects can also be achieved if the present invention is applied to electric vehicles.

What is claimed is:

1. An automotive electric motor-generator apparatus comprising:
    a battery;
    an engine;
    a rotary electric machine linked to said engine by means of a pulley and a belt, said rotary electric machine being driven by electric power from said battery to start said engine during starting of said engine, and being driven by said engine to generate alternating-current power after starting said engine; and
    an inverter unit for converting direct-current power from said battery into alternating-current power and supplying said alternating-current power to said rotary electric machine during said starting of said engine, and converting alternating-current power generated in said rotary electric machine into direct-current power and charging said battery after starting said engine,
    wherein said rotary electric machine comprises:
        a rotor including a field winding and a supported shaft, and being rotatably disposed inside a case formed by a front bracket and a rear bracket;
        a fan fixed to an axial end surface of said rotor; and
        an armature disposed between said front bracket and said rear bracket so as to cover said rotor;
    wherein said inverter unit comprises:
        a resin case made of electrically-insulating resin;
        a heat sink formed integrally with said resin case, said heat sink having a C shape and including fins extending radially disposed upright at a predetermined angular pitch in a circumferential direction on an inner wall surface of said heat sink; and
        a circuit board disposed on said heat sink in an electrically-insulated state and housed inside said resin case; and
    wherein said inverter unit is disposed outside the case so as to surround a bearing box of said rear bracket and directly mounted to an axial end surface of said rear bracket which is perpendicular to a center of said shaft, whereby said inverter unit is cooled by a cooling airflow formed by said fan and flowed along said fins.

2. The automotive electric motor-generator apparatus according to claim 1, wherein said inverter unit is located upstream of said rotary electric machine with respect to a flow direction of said cooling airflow.

3. The automotive electric motor-generator apparatus according to claim 2, wherein output wires of an armature winding of said armature are electrically connected to said inverter unit directly.

4. The automotive electric motor-generator apparatus according to claim 1, wherein output wires of an armature winding of said rotary electric machine are electrically connected to said inverter unit directly.

5. The automotive electric motor-generator apparatus according to claim 1, wherein said inverter unit is designed to be cooled by a cooling medium for cooling said rotary electric machine.

* * * * *